Patented Feb. 17, 1931

1,793,172

UNITED STATES PATENT OFFICE

JERRE HAGGARD, OF EL PASO, TEXAS

ARTIFICIAL STONE

No Drawing.   Application filed June 14, 1929.   Serial No. 370,886.

My invention relates to the fabrication of building material units which may be given various forms, shapes and sizes, according to the particular use and purpose in view. It has been successfully applied to the manufacture of roofing tiles, drain pipe, foundation blocks, bricks, partition slabs, etc.

One object of the invention is to produce a durable and good weathering building unit of economical manufacture.

Another object of the invention is to combine lightness, strength and sufficient hardness in units of the kind described.

Another object is to use raw materials whose physical and chemical properties render them suitable to combine into a homogenous mass under the process treatment explained in this specification.

Another object is to obtain a concrete material which will mould, roll or press up into clean, sharply defined articles of manufacture for the uses indicated.

Another object is to utilize a novel hardening process for the manufacture of articles indicated from certain materials as described.

Other objects and advantages will appear as the invention is described in detail.

In the manufacture of building units of the kind described a number of considerations determine the availability of the raw materials that can be used, as well as the quality of the product when made up. Primarily, every ingredient used must be cheap and plentiful, also fairly uniform in physical and chemical properties. The ingredients used must, furthermore, mix to advantage with the aim of getting a final product superior in concrete properties to any one of the ingredients alone, and for the purpose of this invention the mixed mass must mould, roll or press up into clean, sharply defined articles of manufacture for the uses indicated.

These several considerations, with others, such for instance, the ability to build into sound proof inclosures, good plaster retention, ability to hold nails, lightness, strength and toughness, with freedom from moisture collection have resulted in innumerable experiments of particular mixtures and bonding processes for same, to cause them to retain any desired shapes.

Generally speaking the bonding processes may be divided into those using firing operations, to bring about more or less fusion between the different ingredients of the mixture and those depending upon a chemical reaction, as illustrated by the different kinds of cement and mortars. For some purposes, manufacture of refractories, etc., the firing processes are best, for others the chemical action gives as good and sometimes better results, this invention uses a bonding process of the latter class.

The ingredients used in the building unit material of this invention, and their approximate amounts are: A vesicular aggregate of about 90% by volume of the final mixture. This aggregate may be derived from a considerable range of rocks, both as to variety and size, even down to spalls, and I have found screenings, large enough to preserve a vesicular structure, also give excellent results. For certain grades of work a considerable variety of cinders have also been found to make a serviceable aggregate in combination with the other ingredients indicated, particularly good results being obtained with a class of cinders known commercially as fire box cinders.

With this aggregate, in substantially the amount stated of hard rock, such as basalt, or a resistant cinder, it is found sufficient to add about 1% of granulated gypsite, which is an earthy disintegrated gypsum rock, occurring in great deposits in several parts of the United States. The vesicular aggregate and the gypsite are thoroughly ground together. During this grinding process about 8½% of hydrated lime is fed to the mixture. When these ingredients have been thoroughly mixed and reduced to the desired grade of fineness, which varies to some extent with different classes of work, a small amount of water proofing composition, about ½ of 1% is added together with sufficient water to bring the mass to a plastic composition suitable for working in moulds, presses, etc.

The particular variety of rock used as a vesicular aggregate, referred to above as basalt, may be generally described as a pozzolanic material derived from lava outflows in volcanic regions. Under certain conditions of outflow lava congeals into masses of rock of very open texture, presenting innumerable vesicles, formed by the expansion of the occluded gases when released from subterranean pressure. The most pronounced instance of the formation of such vesicular rock results in the production of pumice stone, which has so many vesicles that it will float on water for months, until thoroughly water logged. Quoting from the Encyclopædia Brit., 14th Ed., article on pumice—"Any type of lava, if the conditions are favorable, may assume the pumiceous state, but basalts and andesites do not so often occur in this form as do trachytes and rhyolites."

After the units have been brought to the required shape by whatever means that may be chosen they are subjected to a curing process involving exposure to steam treatment for a period of several hours. Preferably this steaming is done by exposure in sealed containers to steam a slight pressure above the atmosphere and, in the initial stages of the treatment, having a slight degree of superheat. As the units begin to harden this degree of superheat is increased, at the same time holding the pressure of the steam only a few pounds above the atmosphere. This degree of superheat may be pushed to a temperature up to 150 degrees C. above which the gypsum content of the gypsite begins to change over to anhydride, in which form it does not react as favorably in the hardening process as the unaltered gypsum rock which acts as a retarder during the moisture abstraction process.

A number of attempts have been made to introduce gypsum as an ingredient in artificial building units, using a firing process, but due to the molecular changes brought about by the intense heat of such processes applied to gypsum products, the final result in many cases is loss of cohesion, brittleness and distortion. It has been found, on the contrary, that when gypsum is added as above explained, combined with hydrated lime and cured at suitable temperatures, under a controllable steam application of the heat, that a very superior building unit of even a complicated shape can be produced.

Building units, fabricated as explained above, have moreover been found to show a very slight moisture absorption in use, which is a highly desirable quality in such articles. It is well known that lime bonded bricks have a much lower absorption than cement bonds and because of the peculiar earthy nature of the gypsite filler material used in my units the closure of the aggregate vesicles is exceptionally complete and homogenous.

As a waterproofing compound I have found a double, colloidal silicate of calcium and aluminum to give excellent results, but the more usual sodium silicate can also be used. Any desired color in the units manufactured can be had by adding suitable pigments, as a final step in the mixing operation, however the lime and gypsite ingredients alone give a good natural color with most aggregates.

What is claimed as new is:

1. An artificial stone comprising a vesicular aggregate, granulated gypsite, and hydrated lime.
2. An artificial stone comprising basalt, granulated gypsite, and hydrated lime.
3. An artificial stone comprising cinders, hydrated lime, and gypsite.
4. An artificial stone comprising substantially 90% of vesicular aggregate material, 8½% hydrated lime, and 1% of granulated gypsite.

JERRE HAGGARD.